United States Patent [19]
Higgins et al.

[11] Patent Number: 5,249,593
[45] Date of Patent: Oct. 5, 1993

[54] FLUID PRESSURE RELIEF SYSTEM FOR PRESSURE VESSELS

[75] Inventors: Thomas F. Higgins, Houston; Michael D. McNeely, Katy, both of Tex.

[73] Assignee: Keystone International Holdings Corp.

[21] Appl. No.: 2,805

[22] Filed: Jan. 11, 1993

Related U.S. Application Data

[62] Division of Ser. No. 906,559, Jun. 29, 1992.

[51] Int. Cl.$^5$ .............................................. F16K 17/10
[52] U.S. Cl. ..................................... 137/12; 137/489; 137/506
[58] Field of Search ................ 137/12, 469, 488, 489, 137/506

[56] References Cited

U.S. PATENT DOCUMENTS

| | | |
|---|---|---|
| 2,214,963 | 9/1940 | Jurs . |
| 3,454,039 | 7/1969 | Dunkelis . |
| 3,454,040 | 7/1969 | Dunkelis . |
| 3,477,456 | 11/1969 | Powell .................... 137/489 X |
| 3,583,432 | 6/1971 | Powell ....................... 137/489 |
| 3,664,362 | 5/1972 | Weise . |
| 3,754,566 | 8/1973 | Gemigniani . |
| 3,881,505 | 5/1975 | Dunkelis . |
| 4,312,375 | 1/1982 | Leinemann ................ 137/489 |
| 4,508,131 | 4/1985 | Defrees . |
| 4,542,764 | 9/1985 | Brittingham et al. . |
| 4,586,533 | 5/1986 | Estes . |
| 4,615,356 | 10/1986 | Reip . |
| 4,620,566 | 11/1986 | Gery et al. . |
| 4,705,065 | 11/1987 | McNeely et al. . |
| 4,809,863 | 3/1989 | Woodcock et al. . |
| 5,002,088 | 3/1991 | Engelhardt et al. . |
| 5,048,560 | 9/1991 | Jannotta et al. . |

OTHER PUBLICATIONS

Publications of The Protectoseal Company, Bensenville, Ill., published 1985, Entitled 1) "Spring Loaded Pressure/Vacuum Relief Vents", pp. 1–6; 2) Series No. 7800 Entitled Emergency Pressure Vent; 3) Polyvinyl Chloride Breather Vents, pp. 1–4; 4) Series No. 8740 Entitled In-Line Conservation Breather Vent; 5) Series No. 53300 Entitled Manhole and Emergency Pressure Cover Vent; 6) Series No. P8540 Entitled FRP Conservation Breather Vent; 7) Series No. 18540 Entitled Conservation Breather Vent With Pipe-Away; 8) Series No. 6240 Entitled Vacuum Vent; 9) Series No. 16240 Entitled Vacuum Vent; and 10) Series No. 17800 Entitled Conservation Pressure Vent With Pipe-Away.

*Primary Examiner*—Robert G. Nilson
*Attorney, Agent, or Firm*—Bush, Moseley & Riddle

[57] ABSTRACT

A fluid pressure relief system and method for a pressure vessel or tank (10) having a normal vent (16) with a first pilot operated safety valve (18) and an emergency vent (62) having a second pilot operated safety valve (25). A vapor recovery line (20) is connected to relief valve (18) and collected at a vapor storage container (21). A manway (22) on the pressure vessel (10) shown in FIG. 2 defines the emergency vent (62) and a main valve member (66) has a counterweight (74) thereon to urge main valve member (66) to a seated closed position on nozzle (60). The first pilot operated safety valve (18) for the normal vent (16) is shown in FIG. 7 and has a T-shaped body (142) with a main relief valve member (172) at one end of the body (142) mounted for movement in a generally horizontal direction and controlled by a diaphragm (176) at an opposite end of the body (142).

29 Claims, 8 Drawing Sheets

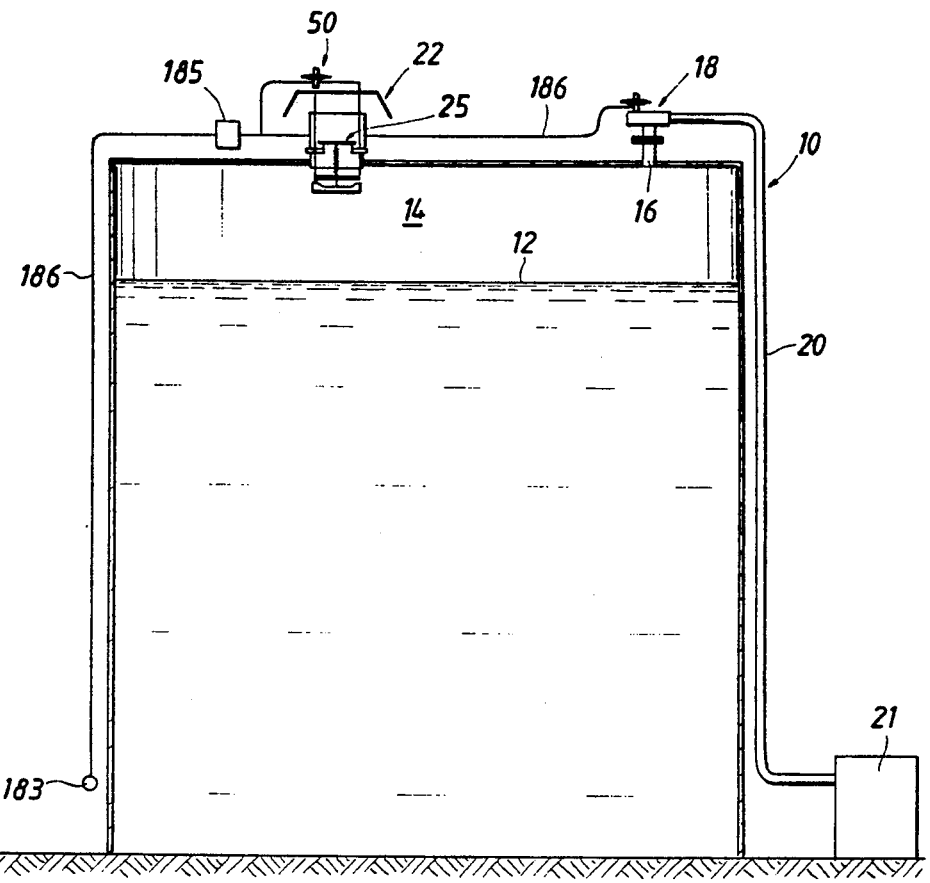
FIG.1
FIG.6
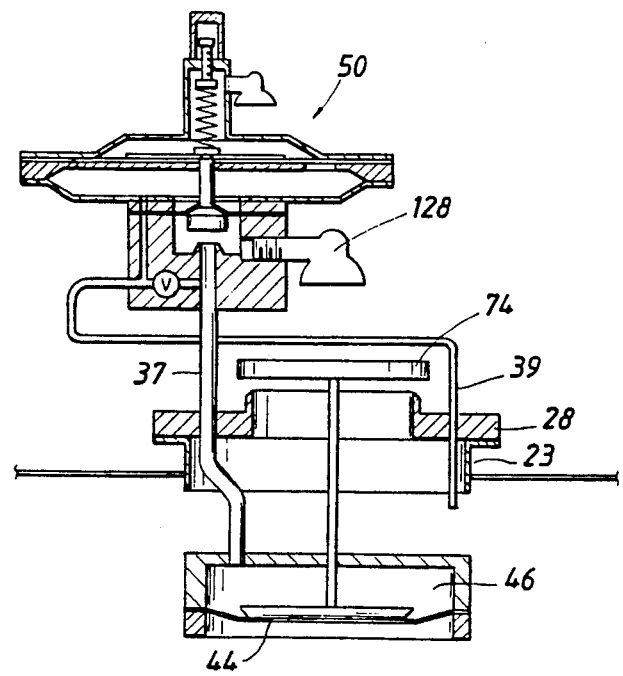

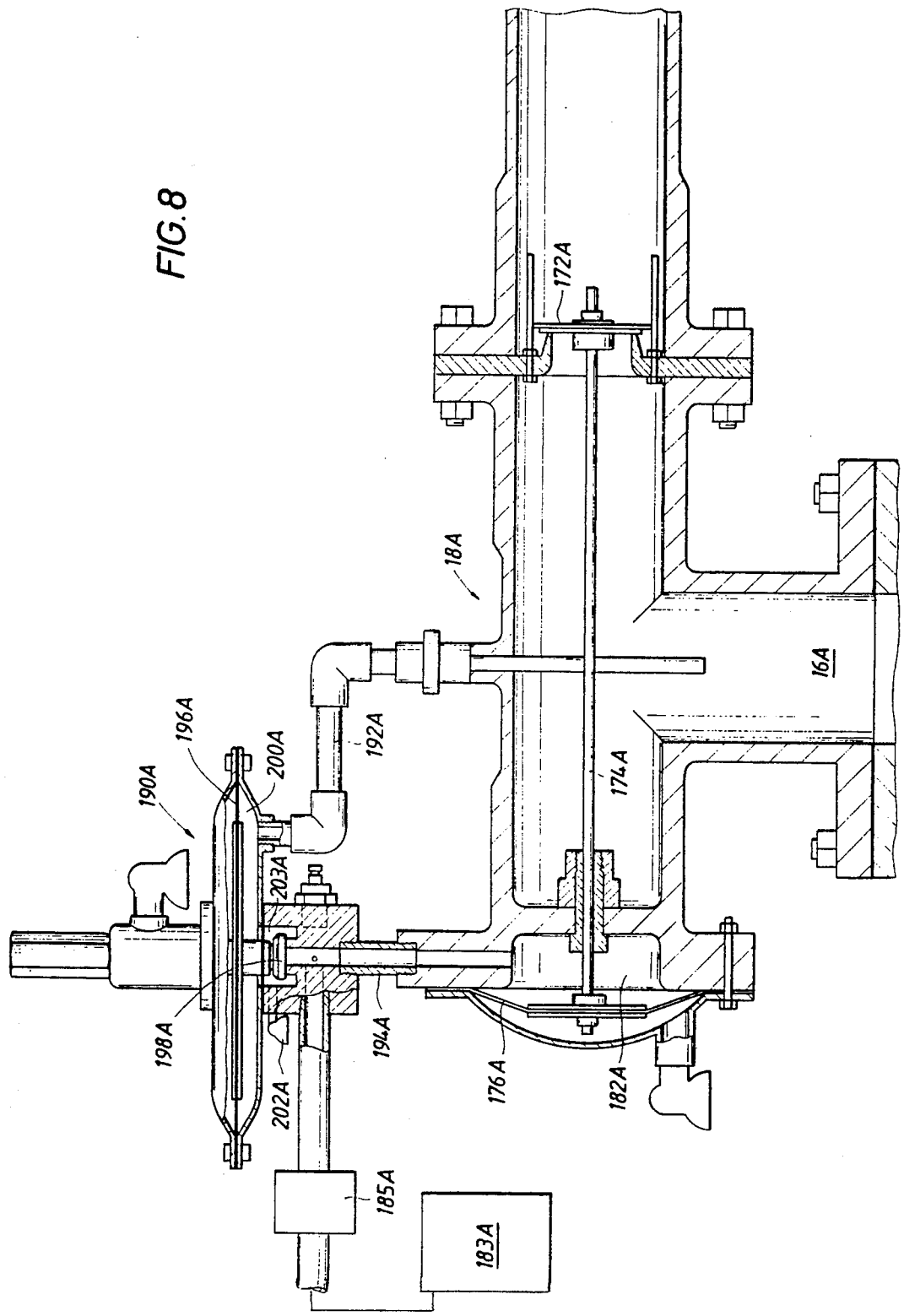

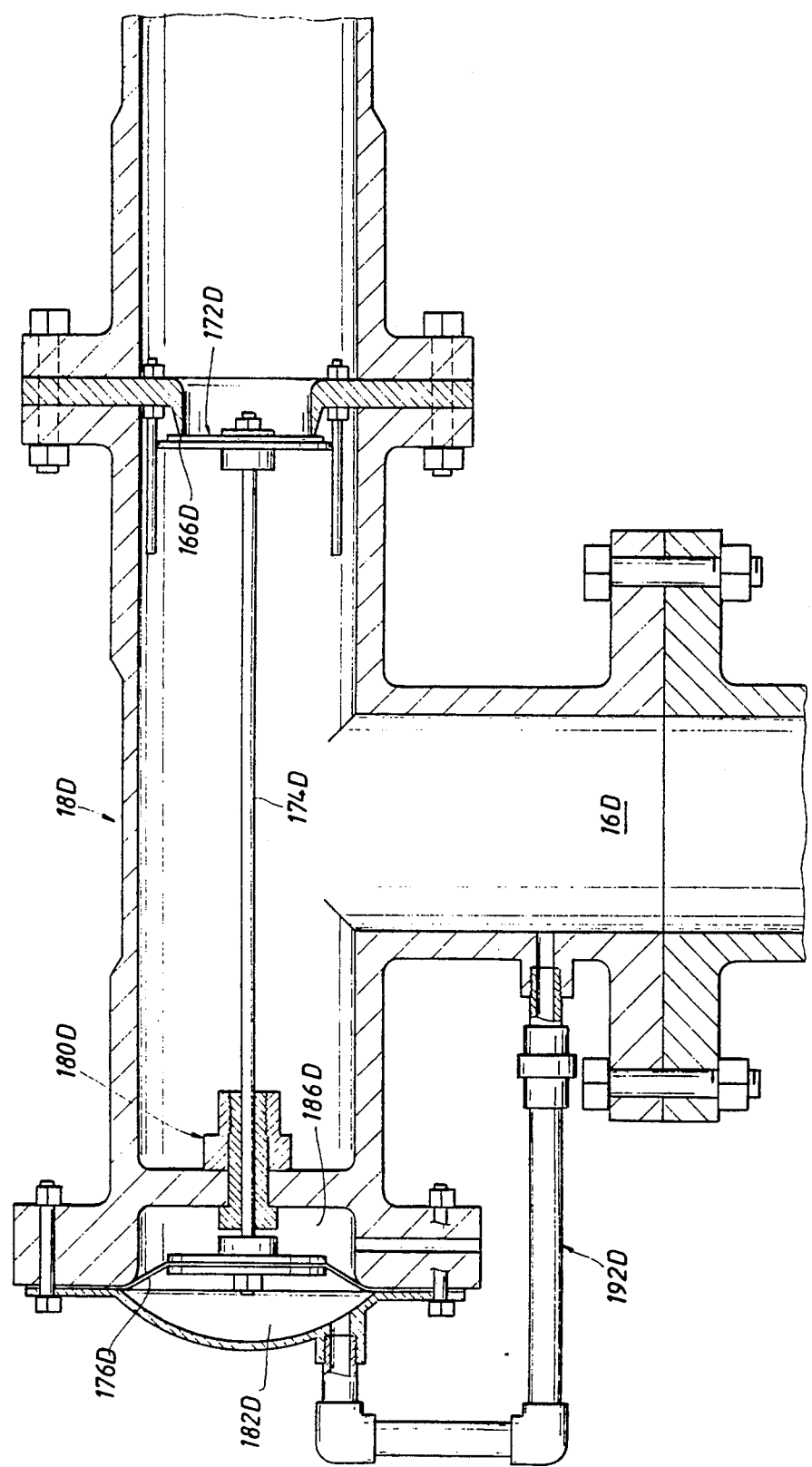

FLUID PRESSURE RELIEF SYSTEM FOR PRESSURE VESSELS

CROSS REFERENCE TO RELATED APPLICATIONS

This application is a divisional application of pending application Ser. No. 906,559 filed Jun. 29, 1992.

FIELD OF THE INVENTION

This invention relates to a fluid pressure relief system for pressure vessels, such as tanks, and more particularly to such a fluid pressure relief system utilizing pilot operated relief valves and the method for providing the relief system.

BACKGROUND OF THE INVENTION

Heretofore, pilot operated relief valves have been utilized on pressure vessels, such as tanks, such as shown in U.S. Pat. No. 4,705,065 dated Nov. 10, 1987, for example, in the opening and closing of a main relief valve member and including the opening of the main valve member under a vacuum condition. However, the main relief valve has not functioned independently of the pilot valve such as may be necessary for a severe service and corrosion environment. The main valve member is in a fail open position in the event of any malfunctioning of the pilot valve.

Present pilot operated relief valves can be operated at pressures very near the set pressure without leakage, and general seat tightness under all conditions is superior because of the high seating loads. Weighted and spring loaded relief valve members, however, are very simple and provide consistent reliability for users. Pilot valves which also provide excellent reliability, except under extreme service conditions, are more complex in operation but have superior performance.

Pilot operated relief valves are particularly useful for low pressure vessels designed for a pressure under 15 psi. Such low pressure vessels are required to have: (1) a normal vent (usually small in orifice size) that limits the pressure rise due to either the addition of liquid to the vessel or the increase in vessel vapor space operating ambient temperature, (2) a normal breather (usually small in orifice size) that limits the vacuum on the vessel caused by removal of liquid from the vessel or a reduction in vessel vapor space operating ambient temperature, and (3) an emergency pressure vent (usually large in orifice size) that relieves the pressure in a vessel in the event the tank is subjected to fire or the like. Present code requirements for a low pressure vessel do not permit the setting of a valve above the maximum allowable working pressure (MAWP). Full relief capacity for the emergency vent may be at a pressure of 20% above the MAWP.

Heretofore, pilot operated relief valves have been utilized with the normal vent of a pressure vessel and upon opening of the main valve member under control of the pilot, fluid vapors have normally been vented to atmosphere. Recent requirements of the Environmental Protection Agency (EPA) limit the leakage of harmful vapors from pressure vessels to a maximum concentration of 500 parts per million and these requirements have to be accomplished by Dec. 31, 1992. Thus, it is necessary under certain conditions to collect the leakage of any harmful vapors from the pilot valve, particularly where the pilot valve is set to operate at a set pressure generally around 100% of the MAWP, for example, and this causes a relatively high frequency of operation of the pilot valve resulting in an opening of the main valve member for vapor leakage.

SUMMARY OF THE INVENTION

The present invention is particularly directed to a fluid pressure relief system for pressure vessels having (1) a normal vent of a relatively small orifice size to limit a pressure increase resulting from the addition of liquid to the vessel or an increase in the ambient temperature in the vapor space, and (2) a separate emergency vent of a relatively large orifice size that relieves the pressure in the pressure vessel in the event of an emergency such as a fire. A pilot operated safety relief valve is utilized with the normal vent and a separate pilot operated safety relief valve is utilized with the emergency vent.

The pilot operated safety relief valve for the emergency vent may be installed as a retrofit unit on the manway of a tank with the relief valve supported on the manway and extending within the tank from the manway. An emergency override is provided for opening of the main valve member in the event of any malfunctioning of the pilot valve.

Also, a vacuum vent for the pressure vessel is provided to limit the vacuum on the pressure vessel resulting from removal of liquid from the vessel or a reduction in the operating ambient temperature in the vapor space of the pressure vessel. The vacuum vent and the emergency vent in the present invention communicate with the atmosphere when opened but these vents rarely open except in emergency conditions. However, the normal pressure vent is connected to a vapor recovery or collection device particularly in view of a low setting of the pilot valves relative to the MAWP generally around 98% of the MAWP, and a resulting high frequency of operation of the pilot valve.

With the two functions being divided, (1) normal venting to a vapor recovery means, and (2) emergency venting and vacuum venting to the atmosphere, it is important to provide an efficient and effective system for these two functions as in the present invention. The hazardous chemicals in pressure vessels are potentially extremely corrosive. Since chloride compounds make up a major portion of these chemicals, the mixing of the chemicals with atmospheric moisture results in hydrochloric acid, which is destructive to practically all but the very expensive metals (such as Hastelloy). The chemicals inside the pressure vessel, however, are usually non-corrosive unless moisture is present in the system.

A primary purpose of this invention is to provide a new and unique system for the control of vapor release or leakage from pressure vessels. The emergency vent normally operates only under fire conditions or in the event of failure of the normal vent to function and the vacuum protection is activated only if the inert gas system using nitrogen with a pressure control regulator should fail. However, because of potential fugitive emissions to atmosphere, the seats for the emergency and vacuum vents have to be of the highest sealing integrity since any leak becomes an atmospheric leak.

It is an object of this invention to provide a fluid pressure relief system and a method for such system for a pressure vessel having a normal vent and a separate emergency vent with a separate pilot operated safety relief valve for each of the vents.

Another object of this invention is to provide such a fluid pressure relief system in which a manway in the pressure vessel acts as a nozzle for the emergency vent, and a pilot operated relief valve mounted within and supported by the manway is operable upon a vacuum condition or emergency pressure condition.

It is an additional object of this invention to provide a pilot operated relief valve which may be installed within the manway of an existing tank as a retrofit unit supported by the manway.

It is a further object of this invention to provide such a fluid pressure relief system in which separate pilot operated relief valves are provided for a normal small diameter vent opening and an emergency large diameter vent opening with a vapor recovery device connected to the normal vent opening to collect vapor therefrom and prevent the escape of possible harmful vapors to atmosphere upon opening of the normal vent main valve member.

It is another object of this invention to provide a pilot operated relief valve for the emergency vent opening in which the main valve member is capable of opening independently of the pilot valve thereby to provide reliability and operability in the event of possible malfunctioning of the pilot valve.

A further object of this invention is to provide a fluid pressure relief system utilizing pilot operated relief valves for a pressure vessel designed for operating fluid pressures under 15 psi and providing an inert gas for the vacuum vent for the pressure vessel.

BRIEF DESCRIPTION OF THE DRAWINGS

FIG. 1 is a generally schematic view of a fluid pressure relief system for a pressure vessel having a relatively small diameter normal vent and a large diameter emergency vent with a pilot operated relief valve for each of the vents;

FIG. 6 is a generally schematic sectional view of the pilot operated relief valve of FIG. 2 but showing the main valve member in an open position under an emergency condition opening in response to the pilot valve;

FIG. 8 is a modified embodiment of a pilot operated relief valve for the normal vent in which a gas spring from an inert gas source applies a constant loading for seating of the main valve member;

FIG. 11 is a further modification of a relief valve for a normal vent which is adapted for opening under a vacuum condition and utilized as a very low pressure vacuum breaker with high integrity seats under positive pressure.

DESCRIPTION OF THE INVENTION

Figure 2:
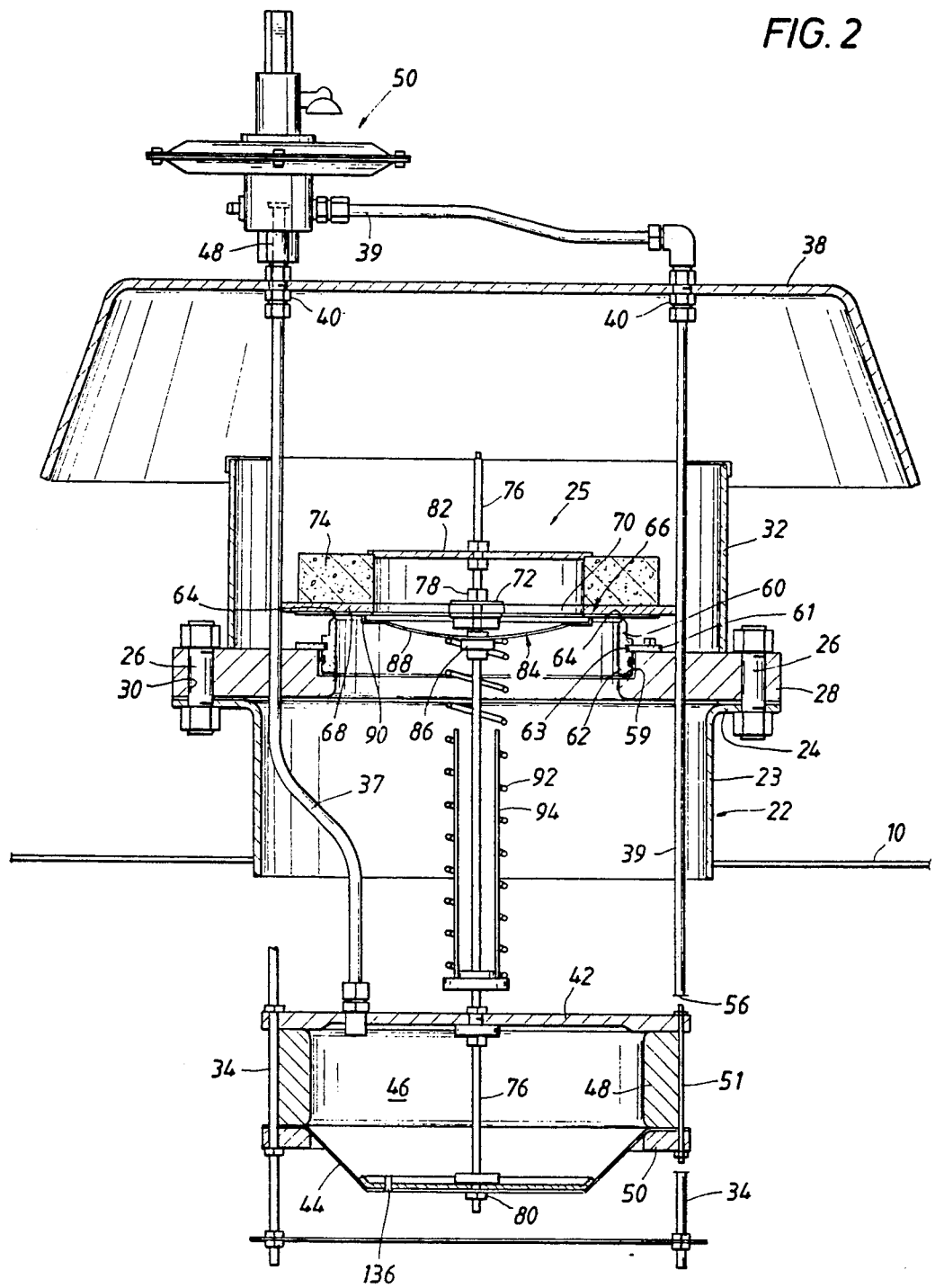
FIG. 2 is an enlarged sectional view of the pilot operated relief valve mounted on the manway on the pressure vessel which forms the large diameter emergency vent with the main valve member in closed seated position over the emergency vent.

Referring to FIG. 1, a fluid pressure relief system in accordance with the present invention is illustrated generally schematically. A pressure vessel is shown generally at 10 and comprises a tank preferably having a liquid fluid stored therein with the liquid level shown at 12 and a vapor space 14 in the tank above the liquid. Oftentimes, chemicals are stored in the tank and various chlorine compounds which are hazardous and corrosive normally comprise a substantial portion of such chemicals.

A normal vent for tank 10 is shown at 16 and a pilot operated relief valve shown generally at 18 is mounted across vent 16. Pilot operated relief valve 18 has a set pressure at which to open and often the set pressure is only slightly below the maximum allowable working pressure (MAWP). Thus, the main valve member closing the vent opens with a high frequency and fluid vapors are normally emitted with each opening. A vapor recovery line 20 is connected to relief valve 18 and receives the vapor upon the opening of the main valve member. The emitted vapors (1) may be burned if inflammable from a flare stack, or (2) may be collected in a vapor storage chamber or container shown schematically at 21 and reprocessed for return to pressure vessel 10 is desired. Thus, hazardous vapors are not emitted to the atmosphere.

Referring to FIG. 2, pressure vessel 10 has a manway generally indicated at 22 to permit a workman to enter the tank. Manway 22 includes a manway opening defined by a tubular housing 23 at least around eighteen (18) inches in diameter projecting upwardly from pressure vessel 10 and generally forming an emergency vent. Housing 23 of manway 22 has an outwardly extending horizontal flange 24 and a separate pilot operated relief valve generally indicated at 25 is supported on flange 24 of manway 22 and may be installed as a retrofit unit on flange 24 of an existing tank by suitable nut and bolt combinations 26. Pilot operated relief valve 25 comprises an annular mounting plate or ring 28 having a plurality of spaced openings 30 for receiving nut and bolt combinations 26 for securing relief valve 25 on flange 24. An upper housing or shroud 32 is secured to the upper surface of annular plate 28. A plurality of rods or struts 34 are secured by suitable fasteners to annular plate 28 and extend vertically therefrom. An upper cover 38 is secured by nuts 40 to the extending upper ends of rods 34 and a plate 42 is secured adjacent the lower ends of rods 34. Fluid conduits 37 and 39 are secured between mounting ring 28 and cover 38 with conduit 37 also secured to plate 42.

A lower operating diaphragm is shown at 44 beneath plate 42 and defining a dome fluid pressure chamber 46 therebetween. Diaphragm 44 is gripped between a spacer 48 and lower ring 50 secured to rods 34 and separate rods 51. Conduit 37 forms a dome fluid conduit and provides fluid communication between dome chamber 46 and a dome port 48 to a pilot valve generally indicated at 50 and mounted on cover 38. Conduit 39 forms a fluid sensing conduit and has a lower sensing port 56 in fluid communication with the interior of tank 10 and an upper inlet port 58 to pilot valve 50.

Mounting ring 28 has a separate inner concentric nozzle ring 60 fitting within a notch 59 in mounting ring 28 and defining a nozzle. A retainer strip 61 is received within a slot 63 in nozzle ring 60 and is secured to ring 28 to hold nozzle ring 60 in position. A suitable O-ring seal is provided between nozzle ring 60 and mounting ring 28. Nozzle ring 60 forms an emergency vent port 62 and an upper annular seat 64. A main pressure relief valve member generally indicated at 66 includes an outer seat ring 68 connected by ribs or spokes 70 to an inner hub 72. Seat ring 68 comprises an annular plate which extends radially outward of nozzle ring 60 to provide an area exposed to fluid pressure upon opening of relief valve 66. An annular counterweight 74 is mounted on seat ring 68 to maintain seat ring 68 in seated closed position on annular seat 64 under a predetermined constant loading with seat ring 68 moved upwardly to an unseated open position at a predetermined fluid pressure within tank 10 above the maximum allowable working pressure. A limited flexure of nozzle ring 60 relative to mounting plate may occur from counterweight 74. An operating shaft or rod 76 is secured to hub 72 of valve member 66 at 78 and to diaphragm 44 at 80. Cross ties 82 are secured to rod 76 and maintain counterweight 74 in position. Upper housing 32 about main relief valve member 66 extends a substantial distance outwardly of main relief valve member 66 and provides a partial restriction to the vapor or fluid exhausted upon the opening of main valve member 66. Such a restriction creates an additional lifting force for opening of valve member 66 with a pressure band of around 10% provided between the initial cracking of valve member 66 and the full open position of relief valve member 66. Lower plate 42 has a suitable opening receiving rod 76 for sliding movement.

Mounted beneath main valve member 66 for sliding movement on operating rod 76 is a vacuum valve member generally indicated at 84 having a hub 86 receiving rod 76, and a generally concave vacuum plate member 88 secured to hub 86 having an outer annular seat 90 adapted to seat against the lower surface of main valve member 66. A vacuum spring 92 extending about a support tube 94 continuously urges vacuum valve member 84 into seated contact against main valve member 66. Upon the reaching of a predetermined low or negative pressure in tank 10, vacuum valve 84 moves downwardly along rod 76 to an open position relative to main valve member 66 to permit an increase in fluid pressure in tank 10 to the predetermined minimum fluid pressure as controlled by spring 92.

Figure 3:
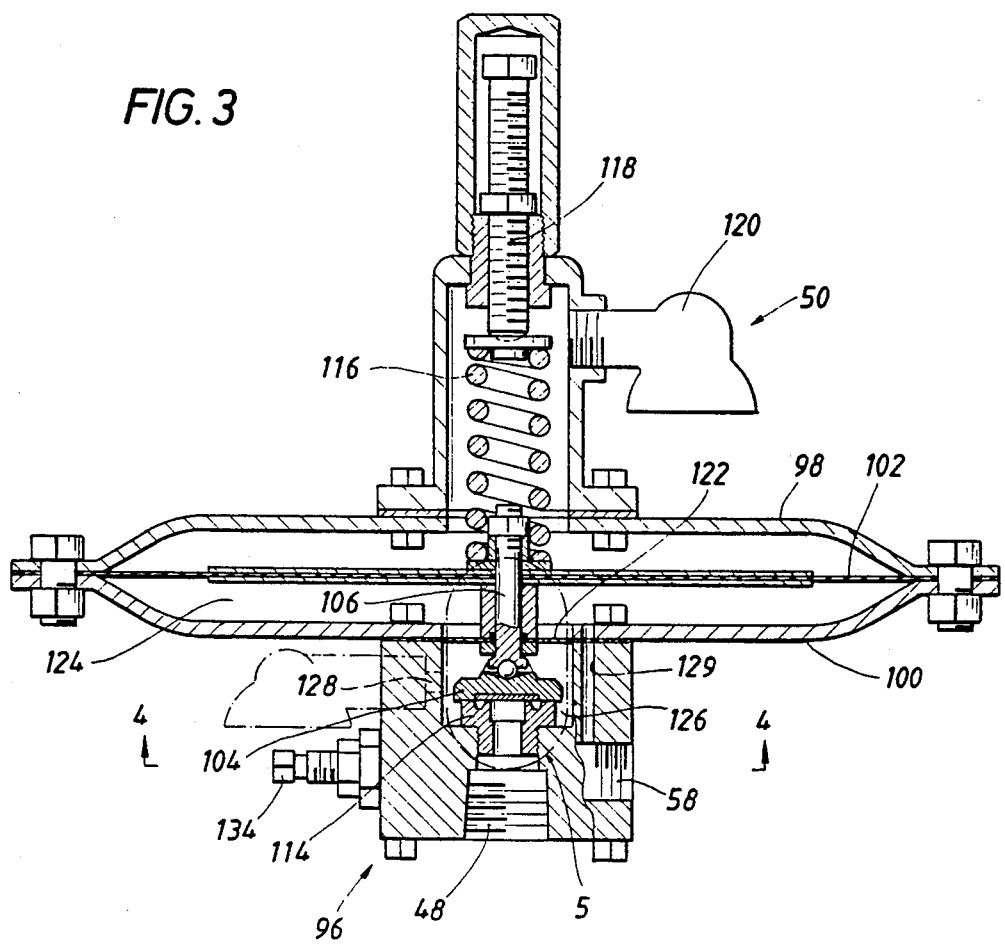
FIG. 3 is an enlarged cross sectional view of the pilot valve shown in FIG. 2.
Figure 4:
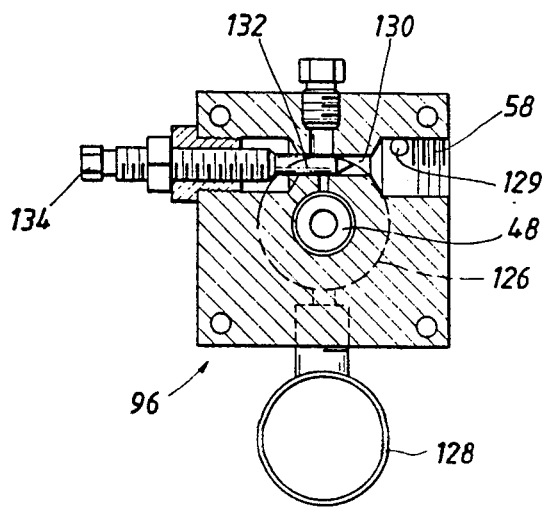
FIG. 4 is a section taken generally along line 4—4 of FIG. 3.
Figure 5:
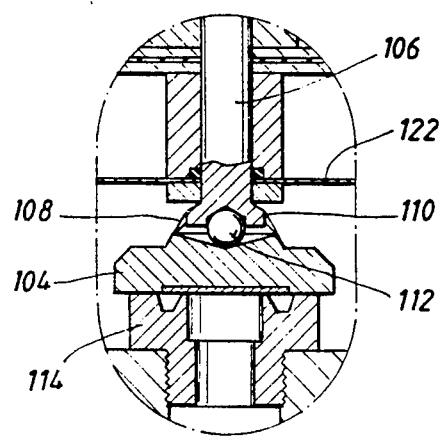
FIG. 5 is an enlarged fragment of the pilot valve designated by numeral 5 in FIG. 3 showing the valve member in a seated position.

Pilot valve 50 as shown particularly in FIGS. 3-5 has a lower main body 96 secured to cover 38. Diaphragm body portions 98 and 100 grip a diaphragm 102 therebetween. A valve 104 is connected to a stem 106 secured to diaphragm 102 and movable with diaphragm 102. Valve 104 has an upper annular extension 108 fitting about an enlarged bulbous end 110 of valve 106 with a ball 112 between stem 106 and valve 104 to permit pivoting of valve 104 relative to stem 106. A nozzle 114 is mounted in body 96 and valve 104 seats against nozzle 114 in a closed position. The seating force of valve 104 against nozzle 114 is determined by spring 116 and adjusting screw 118 acting against the upper end of spring 116 to control the compression thereof. A vent to atmosphere is provided at 120.

A lower diaphragm 122 secured to shaft 106 separates a fluid inlet sensing chamber 124 adjacent diaphragm 102 and a fluid outlet chamber 126 vented to atmosphere by vent 128. A fluid passage 129 extends between inlet chamber 124 and inlet port 58. A fluid passage 130 as shown in FIG. 4 extends between dome port 48 and inlet port 58 and inlet fluid pressure is in direct fluid communication with dome port 48 and dome chamber 46 through passage 130. A needle valve 132 fitted within fluid passage 130 provides a variable flow restriction between ports 48 and 58 and may be adjusted by an externally threaded screw 134. Needle valve 132 by varying the flow restriction determines the responsiveness of main valve member 68 to changes in fluid pressure within tank 10 and if a rapid response is desired for opening of main valve member 68 upon an increase in fluid pressure within tank 10, needle valve 132 is adjusted inward a maximum amount. A suitable pilot valve is sold as Model No. 93 by Anderson, Greenwood & Company, Stafford, Tx.

As indicated above, pilot operated relief valve 25 is provided for operation only in an emergency or negative pressure situation in which pilot operated pressure relief valve 18 is not adequate for relief of the undesired pressure condition. The predetermined high fluid pressure at which relief valve 22 is set to open is greater than the fluid pressure level at which relief valve 18 is set to open.

For operation of pilot operated valve 25, main valve member 68 remains in seated closed position on nozzle 60 until a predetermined high fluid pressure is reached in tank 10. For example, with pilot valve 50 set at 10 psi for a low pressure vessel under 15 psi, pilot valve member 104 remains in closed seated position along with main valve member 68 until a predetermined high pressure, such as 10 psi for example, is reached within tank 10. Fluid pressure in inlet sensing chamber 124 from inlet port 58 and port 129 moves diaphragm 102 and shaft 106 upwardly to unseat pilot valve member 104 and thereby vent dome chamber to atmosphere through vent 128 to reduce fluid pressure in dome chamber 46 and permit opening of main valve member 68. After initial opening or cracking of main valve member 18, if the pressure continues to rise, such as resulting from a fire or the like, main valve member 18 will move to a fully open position in a relatively short time period.

It is noted that diaphragm 44 has a relatively small opening 136 therein. Opening 136 provides a drain for any condensate within dome chamber 46 and also provides for an equalization of fluid pressure between dome chamber 46 and the interior of tank 10. A time delay dependent on the size of opening 136 is normally provided before the pressure within dome chamber 46 is equalized with the pressure within tank 10. In the event pilot valve 50 malfunctions and pilot valve member 104 will not open, main relief valve 25 will override pilot valve 50 and provide opening of main valve member 68 if a predetermined high fluid pressure is reached in tank 10 such as 11 psi for example.

In the event pilot valve 50 becomes inoperative such as from obstructions in sensing tubes or conduits 37, 39, or failure of diaphragm 102, main relief valve 25 will operate independently. Main valve member 66 will crack at a pressure over the set pressure of pilot valve 50 such as 110% of the set pressure and then move to a fully open position at a pressure of 120% of the set pressure of pilot valve 50. The 10% pressure band of valve member 66 from crack to full open position is provided by the additional lifting forces obtained from the partial restriction provided by shroud or upper housing 32 about valve member 66. Leakage at valve seat 64 at pressures below the set pressure of pilot valve 50 is prevented as a result of the residual seating load exerted by counterweight 74.

Figures 7, 7A:
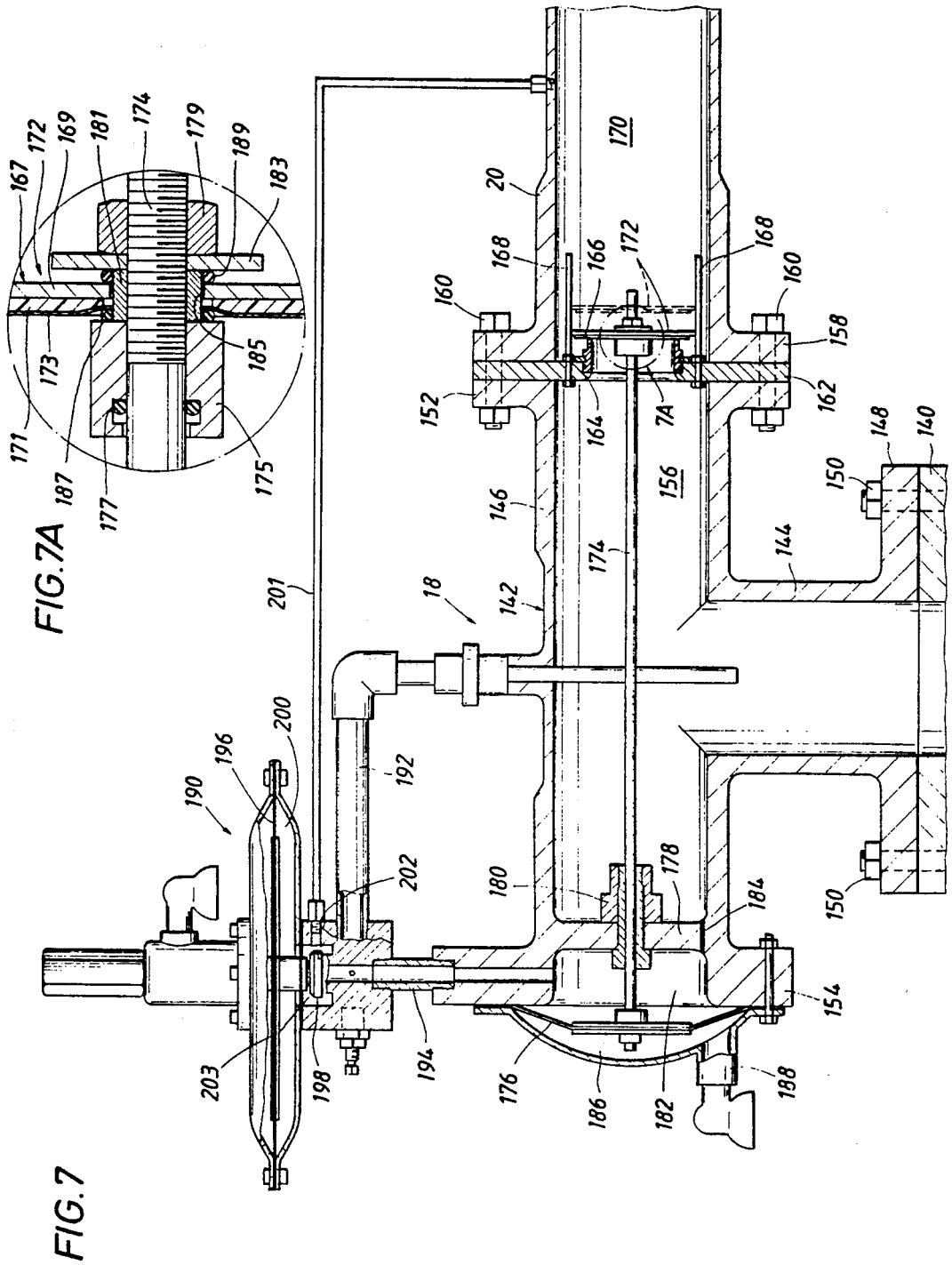
FIG. 7 is an enlarged cross sectional view of an embodiment of a pilot operated relief valve for the small diameter normal vent of the pressure vessel.
FIG. 7A is an enlarged cross sectional view of the connection of the main valve member shown in the embodiment of FIG. 7 to the valve stem.

Referring now to FIG. 7, pilot operated relief valve generally indicated at 18 is mounted on the normal vent 16 for pressure vessel 10. Vent 16 has an upper annular flange 140. Relief valve 18 includes a main body 142 formed in a so-called T-section preferably formed of a plastic material such as fiber reinforced polyester. Body 142 has a lower body portion 144 extending at right angles to an upper body portion 146. Lower body portion 144 has a lower flange 148 mating with flange 140 and secured thereto by suitable nut and bolt combinations 150. Upper body portion 146 has opposed end flanges 152 and 154 and defines a fluid chamber 156 in continuous fluid communication with the interior of pressure vessel 10. Vapor recovery line 20 to collection container 21 has an annular flange 158 in opposed relation to flange 152 and connected thereto by suitable nut and bolt combinations 160 to clamp a mounting ring 162 therebetween. Mounting ring 162 has a notch 163 receiving an inner nozzle ring 164 forming a valve seat 166. Guide members 168 are secured to seat ring 162 and extend in a direction parallel to the flow discharge passage 170 defined by valve recovery line 20. Mounting ring 162 and nozzle ring 164 are similar to the arrangement shown in FIG. 2.

Mounted on valve seat 166 adjacent guide members 168 is the main relief valve member generally indicated at 172 secured to one end of an operating shaft 174. Referring to FIG. 7A, valve member 172 includes an integral valve disc generally indicated at 167 comprising an outer metal plate 169, an adjacent Teflon (a DuPont trademark) plate or layer 171 preferably formed of a spun Teflon material sold by W. L. Gore & Associates, Inc. under the trademark "Gore-Tex", and a thin Teflon layer or film 173 for contacting valve seat 166. Teflon layer 171 may, for example, be around 0.062 inch in thickness, and Teflon layer 173 may, for example, be around 0.010 inch in thickness. Valve member 172 forms a low pressure seal which seals at pressures between around one-half (½) psi and four (4) psi and it is desired that valve disc 167 seal tightly against valve seat 166. To ensure a tight sealing relation against valve seat 166, disc 167 is mounted on shaft 174 to permit a limited pivoting or swivel motion relative to shaft 174. Internally threaded collar 175 on shaft 174 has an internal O-ring 177 sealing against shaft 174. An outer internally threaded nut 179 on shaft 174 forces spacer 181 and washer 183 against collar 175 in a tight gripping action. Disc 167 has a central opening 185 of a diameter slightly greater than the outer diameter of spacer 181 which is received within opening 185 to permit limited relative movement. Resilient O-ring 187 is positioned between disc 167 and collar 175 while O-ring 189 is positioned between disc 167 and washer 183. Thus, disc 167 may easily wobble or swivel about O-rings 187 and 189 thereby to provide a tight sealing relation between disc 167 and valve seat 166. Valve member 66 as shown in FIG. 2 may also be provided with a mounting as shown in FIG. 7A, if desired, to provide a tight seal against valve seat 64.

A diaphragm 176 is secured to the other end of shaft 174. A partition 178 in main body portion 146 supports a hub 180 which receives and supports shaft 174 for relative sliding movement. A diaphragm dome chamber 182 is provided adjacent diaphragm 176. A port 184 extends between dome chamber 182 and fluid chamber 156. An outlet chamber 186 is vented to atmosphere at 188.

A pilot valve is shown at 190 having an inlet line at 192 in fluid communication with pressure vessel 10 and dome line 194 extending to dome chamber 182. Pilot valve 190 is similar to pilot valve 50 shown in FIGS. 3-5 and operates in a similar manner. A diaphragm 196 is connected to valve member 198. Diaphragm sensing chamber 200 is in fluid communication with inlet line 192. A vent shown at 202 is connected by line 201 to discharge passage 170 to communicate outlet chamber 203 with vapor recovery line 20. Upon an increase in fluid pressure in pressure vessel 10, valve 198 opens to vent the inlet chamber to atmosphere thereby to reduce the fluid pressure in dome chamber 182 and move valve member 172 to an open position. Any vapor or liquid from tank 10 is leaked through line 170 to collection tank 21 for disposal or reuse. Upon a reduction in pressure in tank 10 to a pressure below the set pressure of pilot valve 190, valve member 198 closes and fluid pressure in dome chamber 182 is increased to effect closing of valve member 172. Valve member 172 will normally move back and forth in a modulating action to control relatively minor fluctuations in fluid pressure. In the event of an emergency and a very high increase in fluid pressure within tank such as 103% above the set pressure, valve member 172 will move to open position and remain in open position. In addition, relief valve 25 will open to provide relief in such an emergency situation. Thus, under normal operation and normal fluctuations in fluid pressure in pressure vessel 10 at or just below set pressure, pilot operated relief valve 18 is adequate for the relief of pressure within pressure vessel 10. Pilot valve 190 is similar to pilot valve 50 and is sold as Model No. 93 by Anderson, Greenwood & Company, Sugar Land, Tx.

It may be desirable under certain conditions to provide a source of inert gas, such as nitrogen, for pilot valves 50 and 190. For that purpose, a source of inert gas is shown at 183 in FIG. 1 with a pressure regulator 185 in supply line 186 to pilots 50 and 190.

Referring now to FIG. 8 a separate embodiment of the pilot operated relief valve shown in FIG. 7 is shown at 18A including a main valve member 172A connected to one end of shaft 174A and a diaphragm 176A connected to the other end of shaft 174A. Dome chamber 182A is supplied with fluid from an inert gas source 183A which is preferably nitrogen. A pressure regulator is shown at 185A to control the pressure in dome line 194A to dome chamber 182A. Pilot valve 190A has a diaphragm 196A and an inlet sensing chamber 200A in fluid communication with tank 10A from inlet line 192A extending within vent 16A of the associated pressure vessel. Valve member 203A is connected to diaphragm 196A for movement and an outlet chamber 203A is vented to atmosphere through vent 202A. Since the vented fluid is nitrogen or some other inert gas not harmful to the environment, the vented fluid is not collected. Thus, the fluid in the pressure vessel from vent 16A is isolated from valve member 198A and dome chamber 182A. Pilot valve 190A functions in a manner similar to pilot valve 190 shown in FIG. 7. Upon an increase in fluid pressure in the associated pressure vessel, an increase in fluid pressure occurs in inlet chamber 200A to open valve member 198A to vent dome chamber 182A to atmosphere through outlet chamber 203A and vent 202A. A reduction in fluid pressure in dome chamber 182A effects opening of main relief valve member 172A until a reduction in pressure occurs in vent 16A thereby to effect closing of valve member 198A. Safety relief valve 18A would normally be utilized in combination with the emergency safety relief valve 22 as shown in FIG. 2.

Figure 9:
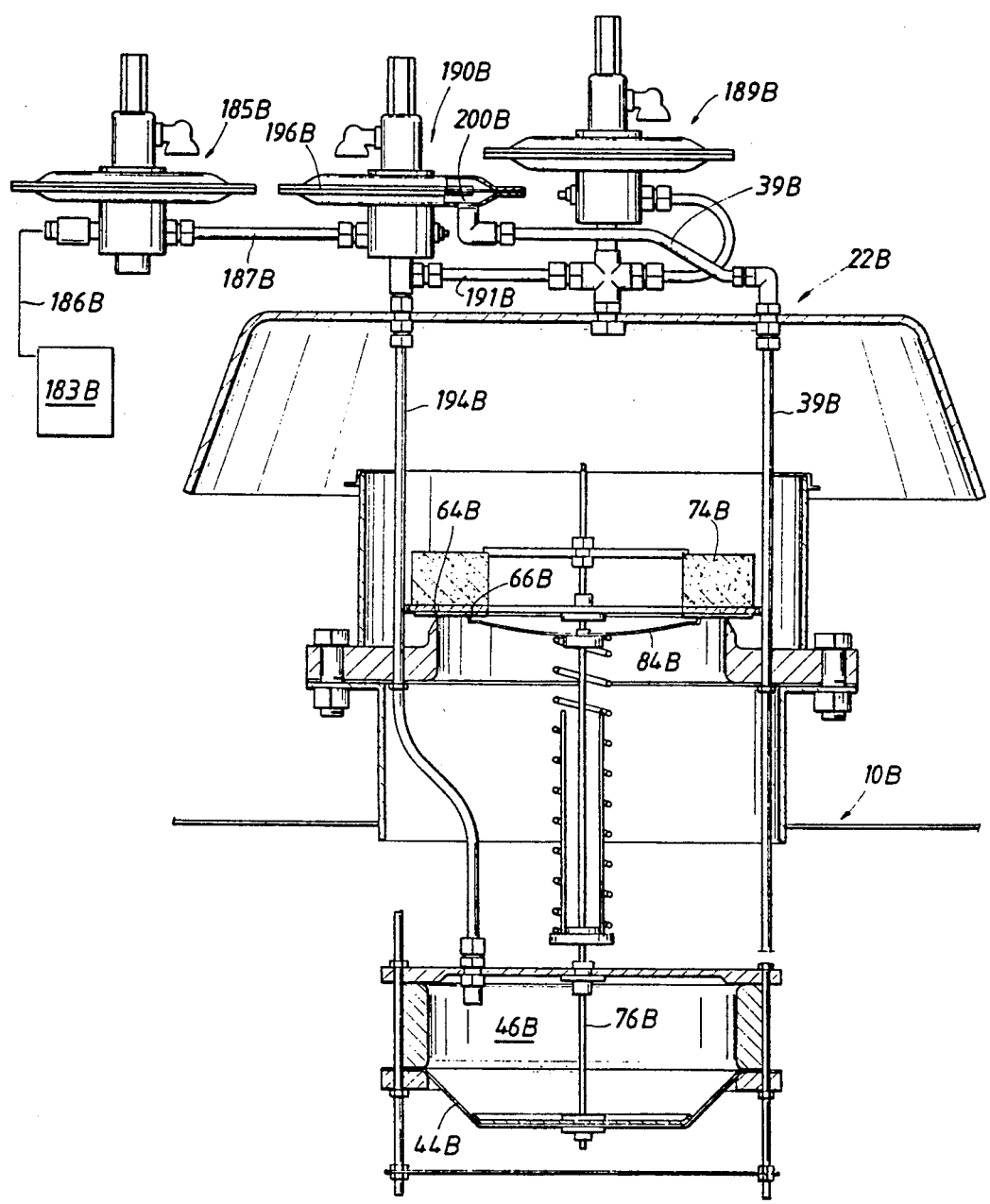
FIG. 9 is a modified embodiment of a pilot operated relief valve for the emergency vent in which a separate inert gas source is provided to the diaphragm chamber for operation of the main valve member.

Referring to FIG. 9, another embodiment of emergency safety relief valve shown in FIG. 2 is shown at 22B. Main relief member 66B is shown with counterweight 74B and associated vacuum valve member 84B. Main valve member 66B is seated against seat 64B. Inlet sensing line 39B extends from tank 10B to inlet sensing chamber 200B of pilot valve 190B adjacent diaphragm 196B. Pilot valve 190B is similar to pilot valve 190A of the embodiment of FIG. 8. Dome line 194B extends to dome chamber 46B adjacent diaphragm 44B connected by shaft 76B to main relief member 66B. An inert gas such as nitrogen is supplied to dome chamber 46B from a suitable gas source shown at 183B and line 186B to fluid pressure regulator shown at 185B, and then through line 187A to pilot valve 190B and dome line 194B.

A back pressure regulator valve is shown at 189B and is in fluid communication with dome chamber 46B through line 191B to dome line 194B. Line 191B is in fluid communication with inert gas line 187A through pilot valve 190B. Regulator 185B supplies inert gas preferably nitrogen to pilot 190B through line 187A and conduit 194B to chamber 46B. The regulated pressure is at a value sufficient to force the main operating element downward to seat valve 64B. The pressure is approximately two times the pressure in tank 10B in order to keep the valve closed when the pressure in tank 10B is less than around 110% of the set pressure of pilot 190B. If tank pressure rises to the set pressure of pilot 190B then fluid pressure acts on diaphragm 200B to open pilot 190B. The pressure is then reduced in chamber 46B by venting the inert gas to atmosphere. Back pressure regulator valve 189B is similar in function to pilot 190B but is set to open at a higher fluid pressure than is valve 189B. Its purpose is to set an upper limit on the pressure in chamber 46B and to maintain that maximum value should regulator 185B fail to control the source pressure.

Regulator 185B is of a type commercially available and includes a large diameter diaphragm to sense the low pressure required. The system pressure is sensed through a regulator exhaust port. When the system pressure is below the predetermined set pressure, the regulator opens and allows inert gas such as nitrogen to flow from a fluid supply port to an exhaust port for increasing the system pressure. When the system pressure reaches the predetermined set pressure, the regulator closes and prevents any further increase in the system pressure. A suitable commercially available regulator is sold as a model RA regulator by Anderson, Greenwood & Company, Stafford, Tex.

Figure 10:
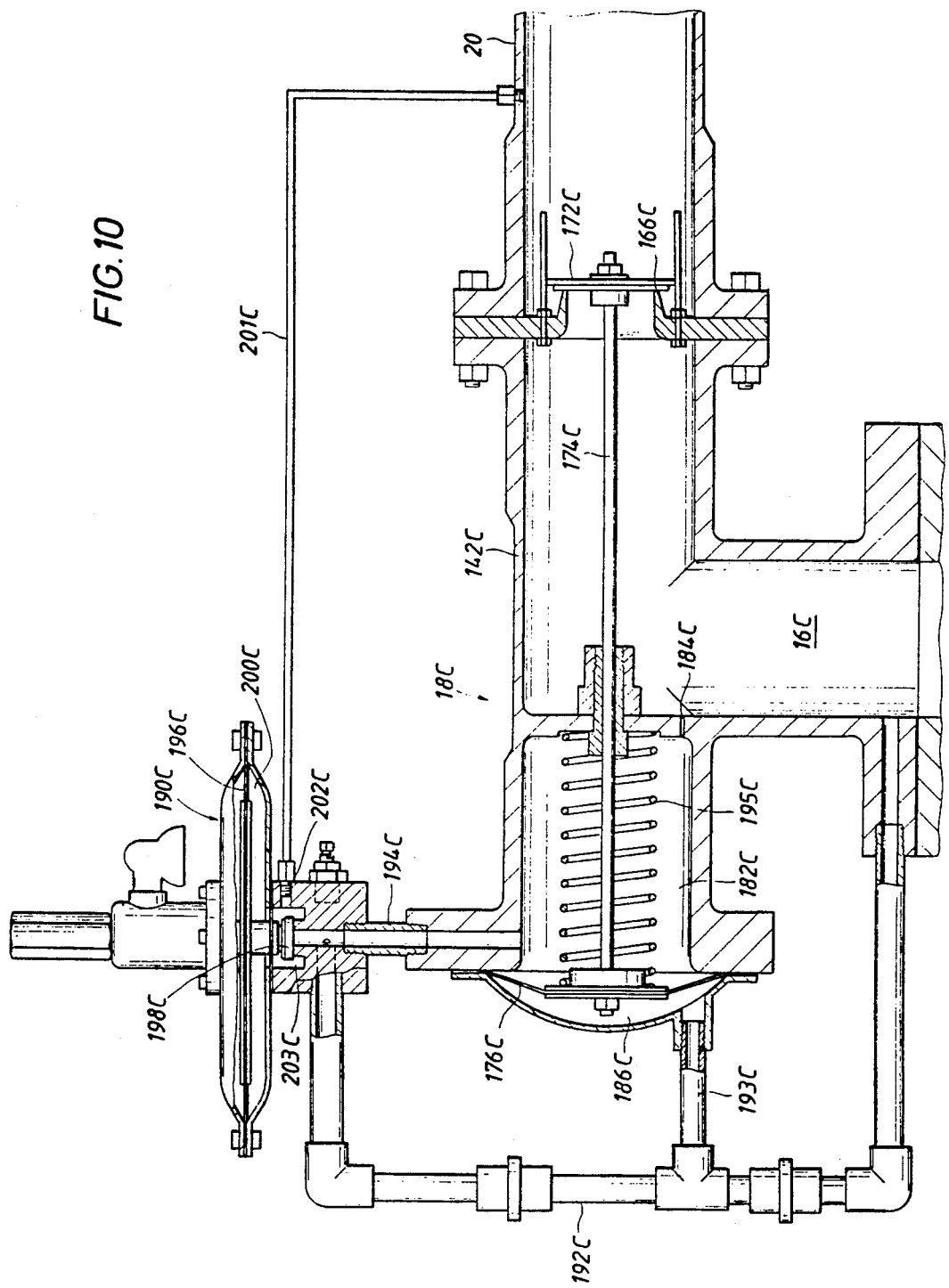
FIG. 10 is a modified embodiment of a pilot operated relief valve for the normal vent in which a spring is provided in the diaphragm chamber for seating of the main valve.

Referring now to FIG. 10, another embodiment of the present invention is shown which is adapted for use without being employed with an emergency safety relief valve such as shown at 22 for the embodiment of FIGS. 1-7. Safety relief valve member 18C is generally similar to the safety relief valve member shown in FIGS. 3-5 and includes a T-shaped main body 142C having a main valve member 172C therein connected to one end of shaft 174C. Diaphragm 176C is connected to the other end of shaft 174C. A dome chamber 182C is on one side of diaphragm 176C and diaphragm chamber 186C is on the other side of diaphragm 176C. Dome line 194C extends to pilot valve 190C. Diaphragm 196C is connected to pilot valve member 198C and diaphragm chamber 200C is in fluid communication with the tank pressure at vent 16C by conduit 192C similar to pilot 50 on FIG. 2. Outlet chamber 203C is in communication with vapor recovery line 20 through line 201C. Inlet sensing line 192C has one end in fluid communication with vent 16C and its other end in fluid communication with dome line 194C and dome chamber 182C. A branch line 193C is in fluid communication with diaphragm chamber 186C. When pilot valve member 198C is below the set pressure, the fluid pressure in chambers 182C and 186C is equalized. A dome chamber spring 195C urges main valve member 172C to closed position against seat 186C with a force higher than the force exerted against valve member 172C by the fluid pressure within the pressure vessel at vent 16C. A condensation drain port 184C is provided for dome chamber 182C.

Upon an increase in fluid pressure within the pressure vessel above the set pressure, pilot valve member 198C will unseat as a result of fluid pressure from sensing line 192C to reduce the fluid pressure in dome chamber 182C with fluid pressure in valve chamber 156C and outer diaphragm chamber 186C overcoming spring 195C to open main valve member 172C. In the event of an emergency condition, such as the malfunctioning of pilot valve 190C, the main valve member 172C will open independently and relieve the pressure at some perventage above MAWP such as 105% of MAWP with a full open flow at 110% of MAWP. The tank fluid pressure at vent 16C will overcome the spring load from spring 195C to open valve 172C since the diaphragm chambers 182C and 186C are balanced.

Referring now to FIG. 11, a separate embodiment of the pilot operated relief valve shown in FIG. 5 is shown at 18D including a main valve member 172D connected to one end of shaft 174D and a diaphragm 176D connected to the other end of shaft 174D. Dome chambers 182D and 186D are reversed in location from FIG. 5. Dome chamber 182D is in direct communication with the fluid in the pressure vessel from vent 16D. Dome chamber 186D is in direct communication with the atmosphere and is isolated from the fluid in the pressure vessel by seals in bushing 180D and diaphragm 176D. Upon an increase in fluid pressure in the pressure vessel, valve member 172D is urged against valve seat 166D by a combination of fluid pressure acting on valve member 172D and diaphragm 176D. Upon a decrease in fluid pressure in the pressure vessel to below atmospheric, the atmospheric pressure force on the valve member 172D and diaphragm 176D will unseat valve member 172D from valve seat 166D allowing atmospheric pressure to enter the pressure vessel and prevent collapse.

While not specifically shown in the embodiments of FIGS. 8, 10, and 11, the main valve member 172A, 172C and 172D may be connected to the stem 174A, 174C and 174D in a manner similar to that shown in FIG. 7A for main valve member 172 on valve stem 174.

While preferred embodiments of the present invention have been illustrated in detail, it is apparent that modifications and adaptations of the preferred embodi-

What is claimed is:

1. A fluid pressure relief system for a pressure vessel having a relatively small diameter normal vent and a separate relatively large diameter emergency vent; said fluid pressure relief system comprising:
- a first pilot operated safety relief valve for said normal vent and having a main valve member adapted to be moved to an open position at a first predetermined set pressure; and
- a second safety relief valve for said emergency vent including a pilot control valve, said second safety relief valve having a main valve member adapted to be opened under control of said pilot valve at a second predetermined pressure above said first predetermined set pressure, said main valve member for said second safety relief valve being opened independently of said pilot control valve at a third predetermined pressure above said second predetermined pressure.

2. A fluid pressure relief system for a pressure vessel as set forth in claim 1 wherein said pressure vessel has a manway therein of a diameter over around 18 inches and said second safety relief valve is mounted on said manway with said manway defining said large diameter emergency vent.

3. A fluid pressure relief system for a pressure vessel as set forth in claim 2 wherein said second pilot operated relief valve includes vacuum means for opening of said main valve member thereof upon a predetermined low fluid pressure reached in said pressure vessel.

4. A fluid pressure relief system for a pressure vessel as set forth in claim 1 wherein a weight is provided for said main valve member of said second pilot operated relief valve to hold said main valve member in a seated closed position until a predetermined fluid pressure is reached within said pressure vessel whereby said main valve member is moved against said weight.

5. A fluid pressure relief system as set forth in claim 4 wherein a fluid responsive diaphragm for said large diameter emergency vent is provided responsive on one side to fluid pressure within said pressure vessel and defining a diaphragm chamber on its other side in fluid communication with said pilot control valve for said second safety relief valve, and a shaft is secured between said diaphragm and said main valve member for opening of said main valve member for said second pilot operated relief valve upon operation of said pilot control valve at a predetermined pressure differential on opposite sides of said diaphragm.

6. A fluid pressure relief system as set forth in claim 5 wherein a vacuum valve member is provided for said large diameter emergency vent and exposed to fluid pressure from said pressure vessel, said vacuum valve member moving to an open position with respect to said emergency vent upon the reaching of a predetermined low pressure.

7. A fluid pressure relief system as set forth in claim 6 wherein said vacuum valve member is mounted for relative sliding movement on said shaft between said diaphragm and said main valve member, and a vacuum spring urges said vacuum valve member to a closed position relative to said vacuum vent.

8. A fluid pressure relief system as set forth in claim 7 wherein said main valve member has a vacuum port therein and said vacuum valve member is urged by said vacuum spring into sealing contact with said main valve member for closing said vacuum port during normal operation of said second pilot operated relief valve, said vacuum valve member moving out of sealing contact with said main valve member upon the reaching of a predetermined low pressure for opening of said vacuum port.

9. A fluid pressure relief system as set forth in claim 1 wherein vapor recovery means is connected to said vent for said first pilot operated safety relief valve to receive fluid from said vent upon opening of said main valve member at said set pressure thereby to prevent release of fluid to atmosphere.

10. A fluid pressure relief system as set forth in claim 1 wherein said first pilot operated safety valve includes a pilot valve controlling opening and closing of said main valve member for said small diameter normal vent, and vapor recovery means is connected to said small diameter normal vent to receive fluid from said vent upon opening of said main valve member thereby to prevent release of fluid to atmosphere from said pressure vessel.

11. A fluid pressure relief system as set forth in claim 1 wherein said first pilot operated safety relief valve includes a body having a main valve chamber therein in continuous fluid communication with said pressure vessel, a diaphragm adjacent one end of said valve chamber, a main valve member adjacent an opposed end of said valve chamber, and a shaft having opposed ends secured to said diaphragm and to said main valve member for movement therewith.

12. A fluid pressure relief system as set forth in claim 11 wherein the fluid pressure exposed area of said diaphragm is greater than the fluid pressure exposed area of said main valve member to maintain said main valve member closed during normal operating pressure.

13. A fluid pressure relief system for a pressure vessel having a relatively small diameter normal vent and a separate relatively large diameter emergency vent; said fluid pressure relief system comprising:
- a first saftey relief valve for said normal vent and having a main valve member adapted to be moved to an open position at a first predetermined set pressure;
- a second safety relief valve for said emergency vent and having a main valve member mounted for movement between open and closed position; and
- adjustable control means for said second safety relief valve permitting opening of said second safety relief valve at a second predetermined pressure above the first predetermined set pressure for opening of said first safety relief valve, said second safety relief valve overriding said adjustable control means at a third predetermined pressure above said second predetermined pressure.

14. A fluid pressure relief system for a pressure vessel as set forth in claim 13 wherein said pressure vessel has a manway including a manway opening and said second safety relief valve is mounted on said manway with said manway opening defining said large diameter emergency vent.

15. A fluid pressure relief system as set forth in claim 14 wherein a housing is mounted about said manway opening and extends outwardly a substantial distance beyond said second safety relief valve whereby upon opening of said second safety relief valve the fluid exhausted through said manway opening is restricted by said housing to provide a lifting force assisting the opening of said second safety relief valve.

16. A fluid pressure relief system as set forth in claim 15 wherein said second safety relief valve includes a nozzle and a valve member extending radially outwardly of said nozzle to provide an area exposed to fluid pressure upon opening of said valve member thereby to provide a lifting force assisting movement of said valve member to full open position.

17. A fluid pressure relief system for a pressure vessel as set forth in claim 14 wherein said second safety relief valve includes vacuum means for opening of said main valve member thereof upon a predetermined low fluid pressure reached in said pressure vessel.

18. A fluid pressure relief system as set forth in claim 13 wherein a counterweight is positioned on said main valve member of said second safety relief valve for urging said main valve member toward closed position; and a fluid responsive member responsive to fluid pressure within said pressure vessel is operatively connected to said main valve member of said second safety relief valve for effecting movement of said main valve member to an open position against said counterweight upon the reaching of said second predetermined pressure in said pressure vessel when said adjustable control means is operable.

19. A fluid pressure relief system as set forth in claim 18 wherein said fluid responsive member allows movement of said main valve member to an open position against said counterweight upon the reaching of said third predetermined pressure in said pressure vessel when said adjustable control means is inoperable for overriding said adjustable control means.

20. A fluid pressure system for a pressure vessel as set forth in claim 13 wherein said pressure vessel has a manway communicating with the interior of the pressure vessel and defining a cylindrical housing extending upwardly from the pressure vessel and having an upper outwardly extending flange thereon; and said second safety relief valve is supported on and secured to said flange.

21. A fluid pressure system as set forth in claim 20 wherein a nozzle is positioned centrally within said manway to define said emergency vent, and means mount said main valve member of said second safety relief valve for reciprocal movement between open and closed positions relative to said nozzle and for limited pivotal movement relative to said nozzle for effecting sealing against said nozzle.

22. A fluid pressure system as set forth in claim 21 wherein said main valve member of said second safety valve is annular to define a central vacuum opening therethrough; and a vacuum valve is mounted over said vacuum opening and moves to an open position upon the reaching of a predetermined low pressure within said pressure vessel.

23. A fluid pressure relief system for a pressure vessel having a relatively small diameter normal vent and a separate relatively large diameter emergency vent; said fluid pressure relief system comprising:

a first pilot operated safety relief valve for said normal vent and having a main valve member adapted to be moved to an open position at a first predetermined set pressure generally at the maximum allowable working pressure (MAWP) of the pressure vessel and having a pilot valve for controlling the opening and closing of said main valve member; and a second pilot operated relief valve for said emergency vent having a main valve member adapted to be opened at a second predetermined pressure above said first predetermined set pressure for opening of said first pilot operated safety relief valve, and a pilot valve for controlling the opening and closing of said main valve member;

said second pilot operated relief valve including means for overriding the pilot valve upon the reaching of a third predetermined fluid pressure above said second predetermined pressure thereby to permit opening of said main valve member in the event of malfunctioning of said pilot valve.

24. A fluid pressure relief system as set forth in claim 23 wherein vacuum means are provided for opening of said main valve member of said second pilot operated relief valve upon a predetermined low fluid pressure reached in said pressure vessel.

25. A fluid pressure relief system as set forth in claim 24 wherein a counterweight is provided for said main valve member of said second pilot operated relief valve for holding said main valve member in a closed position against a constant seating force.

26. A method of providing a fluid pressure relief system for a pressure vessel comprising the following steps:

providing a relatively small diameter vent and a separate relatively large diameter emergency vent for said pressure vessel;

mounting a first safety relief valve including a pilot control valve on said pressure vessel for said small diameter vent for movement to an open position at a first predetermined pressure in said pressure vessel;

mounting a second safety relief valve including a pilot control valve on said pressure vessel for said large diameter emergency vent for opening of said second relief valve under control of said pilot control valve at a second predetermined pressure above said first predetermined pressure; and providing means for full opening of said second safety relief valve independently of said pilot control valve at a third predetermined pressure within said pressure vessel above said second predetermined pressure under possible emergency conditions.

27. A method for a fluid pressure relief system as set forth in claim 26 including the steps of:

providing a vacuum valve for said large diameter emergency vent in fluid communication with said pressure vessel and moving to an open position relative to said emergency vent upon the reaching of a predetermined low pressure in said pressure vessel.

28. A method for a fluid pressure relief system as set forth in claim 26 including the steps of:

providing for said second safety relief valve a main valve member across said emergency vent; and providing a counterweight for said main valve member for holding said main valve member in closed relation under normal operating fluid pressures in said pressure vessel.

29. A method of providing a fluid pressure relief system as set forth in claim 26 further including the following steps:

connecting vapor recovery means to said small diameter vent for said first safety relief valve to receive fluid from said small diameter vent upon opening of said first safety relief valve at said first predetermined pressure to prevent release of fluid to atmosphere.

* * * * *